United States Patent
Miyazaki et al.

(10) Patent No.: US 9,518,200 B2
(45) Date of Patent: Dec. 13, 2016

(54) CURABLE RESIN COMPOSITION, ADHESIVE COMPOSITION, CURED OBJECT OR COMPOSITE

(75) Inventors: Hayato Miyazaki, Shibukawa (JP); Jun Watanabe, Shibukawa (JP); Hiroshi Suto, Shibukawa (JP)

(73) Assignee: Denka Company Limited, Tokyo (JP)

( * ) Notice: Subject to any disclaimer, the term of this patent is extended or adjusted under 35 U.S.C. 154(b) by 0 days.

(21) Appl. No.: 13/318,057

(22) PCT Filed: Apr. 30, 2010

(86) PCT No.: PCT/JP2010/057657
§ 371 (c)(1),
(2), (4) Date: Oct. 28, 2011

(87) PCT Pub. No.: WO2010/126123
PCT Pub. Date: Nov. 4, 2010

(65) Prior Publication Data
US 2012/0070660 A1 Mar. 22, 2012

(30) Foreign Application Priority Data
Apr. 30, 2009 (JP) ................. 2009-111631

(51) Int. Cl.
*C09J 133/08* (2006.01)
*C09J 133/10* (2006.01)
*C09J 153/00* (2006.01)
*C08F 287/00* (2006.01)

(52) U.S. Cl.
CPC ............ *C09J 133/08* (2013.01); *C08F 287/00* (2013.01); *C09J 133/10* (2013.01); *C09J 153/00* (2013.01); *Y10T 428/2891* (2015.01)

(58) Field of Classification Search
CPC ....... C09J 133/08; C09J 133/10; C09J 153/00; C08F 287/00; Y10T 428/2891
See application file for complete search history.

(56) References Cited

U.S. PATENT DOCUMENTS

| | | | |
|---|---|---|---|
| RE36,140 E | * | 3/1999 | Taguchi et al. .............. 524/850 |
| 6,420,467 B1 | * | 7/2002 | Ohtsuka et al. ............. 524/314 |
| 6,576,081 B2 | * | 6/2003 | Date et al. .................... 156/310 |
| 7,211,625 B2 | * | 5/2007 | Tsuji et al. ..................... 525/93 |
| 7,964,248 B2 | * | 6/2011 | Fong et al. .................... 427/466 |
| 8,362,148 B2 | * | 1/2013 | Messe et al. ................... 525/94 |
| 2006/0024521 A1 | * | 2/2006 | Everaerts et al. ............. 428/522 |

FOREIGN PATENT DOCUMENTS

| | | | |
|---|---|---|---|
| CN | 1167801 A | | 12/1997 |
| EP | 1 431 365 A1 | | 6/2004 |
| JP | 11 323072 | | 11/1999 |
| JP | 2001 055421 | | 2/2001 |
| JP | 2005 307063 | | 11/2005 |
| JP | 2008-115255 | | 5/2008 |
| TW | 473532 | | 1/2002 |
| WO | WO 2006/119469 | | 11/2006 |
| WO | 2008/110564 | * | 9/2008 |
| WO | 2008/127930 | * | 10/2008 |

OTHER PUBLICATIONS

International Search Report Issued Jun. 8, 2010 in PCT/JP10/057657 Filed Apr. 30, 2010.
Extended European Search Report issued Apr. 4, 2013 in Patent Application No. 10769821.9.
Combined Chinese Office Action and Search Report issued Apr. 28, 2013 in Patent Application No. 201080019512.2 with Partial English Translation.

* cited by examiner

*Primary Examiner* — Kevin R Kruer
(74) *Attorney, Agent, or Firm* — Oblon, McClelland, Maier & Neustadt, L.L.P.

(57) ABSTRACT

A curable resin composition that is adhesive and transparent. The curable resin composition comprises (1) a polymerizable vinyl monomer, (2) a curing agent, (3) a reducing agent, and (4) an acrylic block copolymer having a structure represented by formula (1):

$$[a^1]\text{-}[b]\text{-}[a^2] \qquad (1)$$

wherein $[a^1]$ and $[a^2]$ each independently represents a polymer block which consists mainly of structural units derived from an alkyl acrylate and/or an alkyl methacrylate and has a glass transition temperature of 90° C. or higher, and [b] represents a polymer block which consists mainly of structural units derived from an alkyl acrylate and/or an alkyl methacrylate and has a glass transition temperature of −10° C. or lower, the copolymer satisfying the relationship (total mass of $[a^1]$ and $[a^2]$)/(mass of [b])=5/95 to 80/20.

17 Claims, No Drawings

CURABLE RESIN COMPOSITION, ADHESIVE COMPOSITION, CURED OBJECT OR COMPOSITE

The present application is a National Stage of the International Application No PCT/JP2010/057657 filed on Apr. 30, 2010 and which claims priority to Japanese Patent Application 2009-111631 filed on Apr. 30, 2009.

TECHNICAL FIELD

The present invention relates to a curable resin composition, an adhesive composition using the curable resin composition, a cured object formed from the adhesive composition, or a composite comprising bonded objects coated or bonded by the cured object.

BACKGROUND ART

The demand for room-temperature quick-cure adhesives that can be cured in a short time at room temperature has been increasing year by year in response to the trend toward conservation of power, conservation of resources and conservation of energy. Conventionally, second-generation acrylic (SGA) adhesives are known as room-temperature quick-cure adhesives.

While SGA's are of two-component type, they do not require the two components to be precisely weighed, and they can be set in a few minutes or a few tens of minutes at room temperature, even when incompletely weighed or mixed, and sometimes simply on contact of the two components, so they excel in their usability. Furthermore, SGA's have high peel adhesion strength and impact adhesion strength, and have good curing of exposed portions, and are therefore widely used.

In recent years, there has been a demand for adhesives that adhere well with transparent resins without loss of transparency of the transparent resins. Patent Document 1 discloses an adhesive that adheres to transparent resins without loss of transparency.

Patent Document 1: JP 2008-115255 A

SUMMARY OF THE INVENTION

Since the adhesive disclosed in Patent Document 1 is of wet-set type, it has room for improvement in that the adhesive will not set or will take an extremely long time to set when attempting to bond objects into which moisture does not penetrate. For this reason, there has been a strong demand for SGA's capable of being cured in a short time at room temperature while providing high adhesive strength. However, the acrylic rubber and curing agents used in conventional SGA's are colored, making it difficult to prepare transparent cured objects.

The present invention was developed to satisfy these market demands. The present inventors discovered that the above-mentioned problems can be solved by blending certain ingredients (acrylic block copolymers) into the composition of a two-component type acrylic adhesive, thereby resulting in the present invention.

The present invention offers a curable resin composition comprising (1) a polymerizable vinyl monomer, (2) a curing agent, (3) a reducing agent and (4) an acrylic block copolymer.

The acrylic block copolymer preferably has the structure represented by the following formula (1):

$$[a^1]\text{-}[b]\text{-}[a^2] \qquad (1)$$

wherein $[a^1]$ and $[a^2]$ respectively represent, independent of each other, a polymer block consisting mainly of structural units derived from alkyl acrylate esters and/or alkyl methacrylate esters; and

[b] represents a polymer block consisting mainly of structural units derived from alkyl acrylate esters and/or alkyl methacrylate esters.

Additionally, the above $[a^1]$ and $[a^2]$ are preferably block copolymers having a glass transition temperature of at least 90° C. Additionally, the above [b] should preferably be a block copolymer having a glass transition temperature of no more than −10° C. Additionally, the acrylic block copolymers preferably satisfy the relationship (total mass of $[a^1]$ and $[a^2]$)/(mass of [b])=5/95 to 80/20.

The curable resin described above has high strength and/or adhesion after curing, as well as high transparency.

Additionally, the present invention offers the above-described curable resin composition wherein the weight-average molecular weight of the (4) acrylic block copolymer is 5,000 to 4,000,000. This curable resin composition is even more effective.

Additionally, the present invention offers the above-described curable resin composition wherein the molecular weight distribution of the (4) acrylic block copolymer is 0.5 to 1.5. This curable resin composition is even more effective.

Additionally, the present invention offers the above-described curable resin composition wherein the (3) reducing agent is at least one thiourea derivative chosen from the group consisting of acetyl-2-thiourea, benzoylthiourea, N,N-diphenylthiourea, N,N-diethylthiourea, N,N-dibutylthiourea and tetramethylthiourea. This curable resin composition is even more effective.

Additionally, the present invention offers the above-described curable resin composition wherein the (1) polymerizable vinyl monomer is a polymerizable (meth)acrylic acid derivative. This curable resin composition is even more effective.

Additionally, the present invention offers the above-described curable resin composition wherein the (1) polymerizable vinyl monomer comprises the polymerizable (meth) acrylic acid derivatives (i), (ii) and (iii):

(i) a monomer represented by the following formula (A):

$$Z_1\text{—}O\text{—}R_1 \qquad (A)$$

wherein $Z_1$ represents a $CH_2\!=\!CHCO-$ group or a $CH_2\!=\!C(CH_3)CO-$ group, and $R_1$ represents an alkyl group, a cycloalkyl group, a benzyl group, a phenyl group, a tetrahydrofurfuryl group, a glycidyl group, a dicyclopentyl group, a dicyclopentenyl group, a (meth)acryloyl group or an isobornyl group having 1 to 20 carbon atoms;

(ii) a monomer represented by the following formula (B):

$$Z_2\text{—}O\text{—}(R_2O)_p\text{—}R_3 \qquad (B)$$

wherein $Z_2$ represents a $CH_2$=CHCO— group or a $CH_2$=C($CH_3$)CO— group, $R_2$ represents —$C_2H_4$—, —$C_3H_6$—, —$CH_2CH(CH_3)$—, —$C_4H_8$— or —$C_6H_{12}$—, $R_3$ represents an alkyl group, a cycloalkyl group, a benzyl group or a phenyl group having 1 to 20 carbon atoms, and p represents an integer from 1 to 25; and (iii) a monomer represented by the following formula (C):

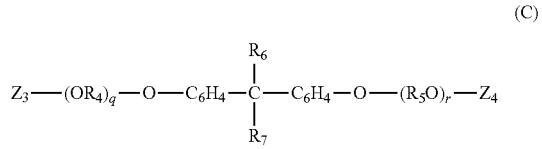

(C)

wherein $Z_3$ and $Z_4$ represent $CH_2$=CHCO— or $CH_2$=C($CH_3$)CO—, $R_4$ and $R_5$ represent —$C_2H_4$—, —$C_3H_6$—, —$CH_2CH(CH_3)$—, —$C_4H_8$— or —$C_6H_{12}$—, $R_6$ and $R_7$ represent hydrogen or an alkyl group having 1 to 4 carbon atoms, and q and r represent an integer from 0 to 8. This curable resin composition has high adhesion, enabling adhesive strain of the bonded object after adhesion to be reduced.

Additionally, the present invention offers the above-described curable resin composition, further comprising a paraffin. In this curable resin composition, the portion in contact with air sets quickly, enabling the adhesion to be improved.

Additionally, the present invention offers the above-described curable resin composition, further comprising a (meth)acrylic acid. This curable resin composition enables the adhesion to be improved.

Additionally, the present invention offers the above-described curable resin composition, which is a two-component type curable resin composition, the first component comprising at least the (2) curing agent and the second component comprising at least the (3) reducing agent. Since this curable resin composition enables a curing reaction to be induced at the time of use, it is highly applicable to various applications.

Additionally, the present invention offers an adhesive composition comprising the above-described curable resin composition. This adhesive composition provides excellent adhesion.

Additionally, the present invention offers an adhesive composition for use with a transparent resin comprising the above-described curable resin composition. This adhesive composition for use with a transparent resin exhibits excellent adhesion to transparent resins, and/or has high transparency, and is therefore suitable for use with transparent resins.

Additionally, the present invention offers a cured object comprising the above-described curable resin composition. This curable resin composition has high strength, and is therefore suitable for use in bonding, coating and the like.

Additionally, the present invention offers a composite having an adhered object coated or bonded by the above-described cured object. Due to the high strength of the above-described cured object, this composite can exist in a state wherein the adhered object is strongly adhered.

Additionally, the present invention offers a composite wherein the adhered object of the above-described composite is a transparent resin. Due to the high transparency of the above-described cured object, this composite is able to have a high transparency overall.

MODES FOR CARRYING OUT THE INVENTION

[Explanation of Terminology]

In the present specification, "glass transition temperature" shall refer to the temperature at which the glass transition occurs in amorphous solid materials generally used in the present technical field. The amorphous state at a lower temperature than this glass transition point is known as the glass state, while the substance is held to be in a liquid or rubber state at temperatures higher than the glass transition point.

As the method of measuring the glass transition temperature, any generally used technique that is known in the present technical field may be used. The glass transition point can be determined by measuring one of the properties that suddenly change at the glass transition point, such as rigidity and viscosity, and monitoring the change depending on temperature. Specific examples of methods for measuring the glass transition temperature include, but are not limited to, the methods described below.

A preferred example is mechanical spectroscopy (dynamic viscoelasticity measurement).

Methods involving measurement of the change in mechanical properties while gradually raising or lowering the temperature of a sample: TMA etc.

Methods involving measurement of heat absorption or heat generation while gradually raising or lowering the temperature of a sample: DSC, DTA, etc.

Methods involving measurement of the response while changing the frequency of periodic force applied to a sample: mechanical spectroscopy (dynamic viscoelasticity measurement) etc.

In the present specification, the expression "(meth)acrylic" refers to "acrylic" and "methacrylic". Additionally, "structure derived from" and "derivative" refer to arbitrary derivatives (like those having substituents such as alkyls) that do not result in loss of the effects of the present invention, and include various derivatives used in the present technical field.

In the present specification, "weight-average molecular weight" may be measured by normal methods used in the present technical field such as various types of size exclusion chromatography. An example of size exclusion chromatography is a method performed, for example, using the below-identified device and conditions, although the invention is not limited thereto.

Device: Tosoh GPC-8020 SEC System
Analysis Conditions:
Column: TSK Guard HZ-L+HZM-N 6.0×150 mm×3
Flow rate: 0.5 ml/min
Detector: RI-8020
Concentration: 0.1 wt/vol %
Injection quantity: 20 μL
Column temperature: 40° C.
System temperature: 40° C.
Solvent: THF
Calibration curve: Prepared using standard polystyrene (PS) (product of PL), weight-average molecular weight (Mw) converted for PS.

Additionally, in the present specification, "molecular weight distribution" shall refer to the value of (weight-average molecular weight/number-average molecular weight). Specifically, taking the chain length distribution obtained by the above-mentioned size exclusion chromatography as an example, the value can be calculated by computing the polystyrene-converted weight-average molecular weight (Mw) and number-average molecular weight (Mn), then determining the value of Mw divided by Mn (Mw/Mn).

Additionally, in the present specification, "two-component type curable resin composition" and "two-component type adhesive composition" refer to curable resin compositions or adhesive compositions having, as substantial curable resin components or adhesive components, two components that are combined to obtain a composition suitable for the present invention. Curable resin compositions or adhesive compositions further comprising a third component within such a range as not to detract from the purpose of the present invention, and embodiments wherein a first component and a second component are consecutively applied to an adhesion surface or coating surface so as to substantially constitute the first component and second component on the coating surface are also included among the "two-component type curable resin composition" and "two-component type adhesive composition" of the present specification.

In the present specification, "bonding" refers to the fixation of a structure to another structure in a connected state. Of course, the case in which different parts of the same structure are connected is also included in "bonding" according to the present specification. Additionally, the expression "coating" in the present specification refers to covering at least a portion of the surface of a structure by a certain substance (such as the cured object of the present invention). Additionally, in this case, the structures which are being bonded or coated shall be referred to as "bonded object", the structure after bonding or coating shall be referred to as "(bonded or coated) composite", the surfaces of the composite that are connected together shall be referred to as "bonding surfaces", the portions where the bonding surfaces or the composites are connected shall be referred to as "bonding portions" and the coated surfaces of the composite shall be referred to as "coating surfaces".

Additionally, in the present specification, "adhesive composition" shall refer to compositions used for applications such as fixation of a structure to another structure in a connected state by means of the composition, in other words, the above "bonding", and compositions used for applications such as covering at least a portion of the surface of a structure, in other words, the above "coating". Additionally, an object obtained by curing an adhesive composition shall be referred to as a "cured object".

For the purposes of the present invention, "transparent resin" shall refer to resins capable of transmitting a standard amount of visible light, especially resins used to take advantage of their transparency. Examples of transparent resins include, but are not limited to, resins having a transparency of at least 20% at one or more wavelengths in the visible range (380 to 750 nm), preferably resins having a transparency of at least 50%, more preferably resins having a transparency of at least 80%, even more preferably resins having a transparency of at least 90%, and most preferably resins having a transparency of at least 95%, at least 98%, at least 99% or 100%.

Additionally, the expression "comprising" covers "consisting mainly of", "consisting essentially of" and "consisting of", "consisting mainly of" covers "consisting essentially of" and "consisting of", and "consisting essentially of" covers "consisting of".

The expression "consisting mainly of", while not limited thereto, indicates that the component in question is present in an amount of at least 70 mass % with respect to the total mass, preferably at least 80 mass %, more preferably at least 90 mass %, even more preferably at least 95 mass %, and most preferably at least 98 mass %, at least 99 mass % or 100%.

Regarding the numerical ranges in the present invention, "to" is inclusive of the upper and lower values. For example, the expression "A to B" means at least A and at most B.

[Modes for Carrying out the Invention]

Herebelow, the present invention shall be described in detail, but the present invention is not limited thereby.

<Resin Composition>

The present embodiment offers a curable resin composition comprising (1) a polymerizable vinyl monomer, (2) a curing agent, (3) a reducing agent and (4) an acrylic block copolymer having a structure represented by the following formula (1):

$$[a^1]\text{-}[b]\text{-}[a^2] \tag{1}$$

wherein $[a^1]$ and $[a^2]$ respectively represent, independent of each other, a polymer block consisting mainly of structural units derived from an alkyl acrylate ester and/or an alkyl methacrylate ester, and having a glass transition temperature of at least 90° C.; and

[b] represents a polymer block consisting mainly of structural units derived from an alkyl acrylate ester and/or an alkyl methacrylate ester, and having a glass transition temperature of no more than −10° C.;

such as to satisfy the relationship (total mass of $[a^1]$ and $[a^2]$)/(mass of [b])=5/95 to 80/20. This curable resin has high strength and/or adhesion after curing, and has high transparency.

The (1) polymerizable vinyl monomer used in the present invention is not particularly limited, and various vinyl monomers having vinyl groups capable of undergoing radical polymerization may be used, within such a range as not to detract from the effects of the present invention.

While the present invention is not limited thereto, the polymerizable vinyl monomer is preferably a (meth)acrylic acid derivative. Furthermore, examples of (meth)acrylic acid derivatives include, for example, the following monomers (i) to (vi), although the invention is not limited thereto.

(i)

A monomer represented by the following formula (A):

$$Z_1\text{—}O\text{—}R_1 \tag{A}$$

wherein $Z_1$ represents a $CH_2$=CHCO— group or a $CH_2$=C($CH_3$)CO— group, and $R_1$ represents an alkyl group, a cycloalkyl group, a benzyl group, a phenyl group, a tetrahydrofurfuryl group, a glycidyl group, a dicyclopentyl group, a dicyclopentenyl group, a (meth)acryloyl group or an isobornyl group having 1 to 20 carbon atoms.

Examples of monomers according to the above (i) include, but are not limited to, methyl (meth)acrylate, cyclohexyl (meth)acrylate, benzyl (meth)acrylate, tetrahydrofurfuryl (meth)acrylate, dicyclopentyl (meth)acrylate, dicyclopentenyl (meth)acrylate, glycerol (meth)acrylate, glycerol di(meth)acrylate, isobornyl (meth)acrylate and (meth)acrylic acid.

(ii)

A monomer represented by the following formula (B):

$$Z_2\text{—}O\text{—}(R_2O)_p\text{—}R_3 \tag{B}$$

wherein $Z_2$ represents a $CH_2$=CHCO— group or a $CH_2$=C($CH_3$)CO— group, $R_2$ represents —$C_2H_4$—, —$C_3H_6$—, —$CH_2CH(CH_3)$—, —$C_4H_8$— or —$C_6H_{12}$—, $R_3$ represents an alkyl group, a cycloalkyl group, a benzyl group or a phenyl group having 1 to 20 carbon atoms, and p represents an integer from 1 to 25.

Examples of monomers according to the above (ii) include, but are not limited to, ethoxyethyl (meth)acrylate, polyethylene glycol (meth)acrylate, phenoxyethyl (meth)acrylate, dicyclopentenyl oxyethyl (meth)acrylate, phenoxydiethylene glycol (meth)acrylate, tripropylene glycol di(meth)acrylate and 1,6-hexanediol di(meth)acrylate.

(iii) A monomer represented by the following formula (C):

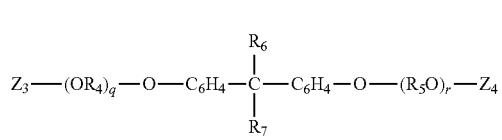

(C)

wherein $Z_3$ and $Z_4$ represent $CH_2=CHCO-$ or $CH_2=C(CH_3)CO-$, $R_4$ and $R_5$ represent $-C_2H_4-$, $-C_3H_6-$, $-CH_2CH(CH_3)-$, $-C_4H_8-$ or $-C_6H_{12}-$, $R_6$ and $R_7$ represent hydrogen or an alkyl group having 1 to 4 carbon atoms, and q and r represent an integer from 0 to 8.

Examples of monomers according to the above (iii) include, but are not limited to, 2,2-bis(4-(meth)acryloxyphenyl)propane, 2,2-bis(4-(meth)acryloxyethoxyphenyl)propane, 2,2-bis(4-meth)acryloxydiethoxyphenyl)propane, 2,2-bis(4-(meth)acryloxypropoxyphenyl)propane and 2,2-bis(4-(meth)acryloxytetraethoxyphenyl)propane.

(iv)

(Meth)acrylic acid esters of polyhydric alcohols not included among the monomers described in paragraphs (i), (ii) and (iii) above.

Examples of monomers according to the above (iv) include, but are not limited to, trimethylolpropane tri(meth)acrylate, neopentylglycol di(meth)acrylate, pentaerythritol tetra(meth)acrylate, dipentaerythritol hexa(meth)acrylate and tris(2-acryloyloxyethyl)isocyanate.

(v)

Urethane prepolymers having a (meth)acryloyloxy group.

Examples of monomers according to the above (v) include, but are not limited to, those capable of being obtained by reactions between (meth)acrylic acid esters having a hydroxyl group, organic polyisocyanates and polyhydric alcohols.

Here, examples of the (meth)acrylic acid esters having a hydroxyl group include, but are not limited to, hydroxyethyl (meth)acrylate, hydroxypropyl (meth)acrylate and hydroxybutyl (meth)acrylate.

Additionally, examples of organic polyisocyanates include, but are not limited to, toluene diisocyanate, 4,4-diphenylmethane diisocyanate, hexamethylene diisocyanate and isophorone diisocyanate.

Additionally, examples of polyhydric alcohols include, but are not limited to, polyethylene glycol, polypropylene glycol, polytetramethylene glycol and polyester polyol.

(vi)

An acidic phosphoric acid compound represented by the following general formula (1):

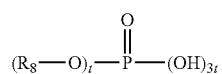

(I)

wherein $R_8$ represents a $CH_2=CR_9CO(OR_{10})_u-$ group (with the proviso that $R_9$ represents a hydrogen or a methyl group and $R_{10}$ represents $-C_2H_4-$, $C_2H_6-$, $-CH_2CH(CH_3)-$, $C_4H_8-$, $-C_6H_{12}-$ or

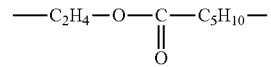

and u represents an integer from 1 to 10), and t represents an integer 1 or 2.

Examples of acidic phosphoric acid compounds according to the above (vi) include, but are not limited to, acid phosphoxyethyl (meth)acrylate, acid phosphoxypropyl (meth)acrylate and bis(2-(meth)acryloyloxyethyl)phosphate.

One or more of the monomers described in paragraphs (i)-(vi) above may be used. Among these, the use of one or more from the group consisting of (i), (ii) and (iii) is preferable, and the use of (i), (ii) and (iii) in combination is more preferable, due to their high adhesion and low adhesive strain in the bonded object after adhesion. When using (i), (ii) and (iii) in combination, the composition in mass ratio should preferably be (i):(ii):(iii)=30-80:10-50:1-20, more preferably 40-70:20-40:5-15, so as to achieve greater effect.

The (2) curing agent used in the present embodiment is not particularly limited as long as it can be used to increase the hardness and promote or control the curing reaction, within such a range as not to detract from the effects of the present invention, and organic peroxides are preferred. Examples of preferable organic peroxides include, but are not limited to, cumene hydroperoxide, paramenthane hydroperoxide, tertiary butyl hydroperoxide, diisopropylbenzene dihydroperoxide, methylethylketone peroxide, benzoyl peroxide and tertiary butyl peroxybenzoate. Of these, cumene hydroperoxide is preferred for its stability.

The amount of curing agent used is preferably 0.1 to 20 parts by mass, more preferably 1 to 10 parts by mass with respect to 100 parts by mass of the polymerizable vinyl monomer. At 0.1 parts by mass or more, a satisfactory curing rate is achieved, and at 20 parts by mass or less, a high storage stability is achieved.

The (3) reducing agent used in the present embodiment is not particularly limited as long as it is a reducing agent that reacts with the polymerization initiator of the present invention to generate radicals, within such a range as not to detract from the effects of the present invention. While the reducing agent is not particularly limited, a thiourea derivative is preferred.

Examples of preferable thiourea derivatives include, but are not limited to, acetyl-2-thiourea, benzoylthiourea, N,N-diphenylthiourea, N,N-diethylthiourea, N,N-dibutylthiourea and tetramethylthiourea. Among these, one or more thiourea derivatives chosen from the group consisting of acetyl-2-thiourea, benzoylthiourea, N,N-diphenylthiourea, N,N-diethylthiourea, N,N-dibutylthiourea and tetramethylthiourea are preferred for greater effect, and acetyl-2-thiourea is more preferred.

The amount of reducing agent such as a thiourea derivative used is preferably 0.05 to 15 parts by mass, and more preferably 0.5 to 5 parts by mass, with respect to 100 parts by mass of the polymerizable vinyl monomer. By adding at least 0.05 parts by mass, the curing rate can be favorably increased, while a high storage stability can be achieved at 15 parts by mass or less.

The (4) acrylic block copolymer used in the present embodiment is preferably a block copolymer having the structure represented by the following formula (1):

$$[a^1]\text{-}[b]\text{-}[a^2] \qquad (1)$$

Here, the relationship (total mass of $[a^1]$ and $[a^2]$)/(mass of $[b]$)=5/95 to 80/20 is satisfied.

The types of structures derived from the alkyl acrylate ester and/or alkyl methacrylate esters $[a^1]$ and $[a^2]$ in Formula (1) are not particularly limited as long as they are within such a range as not to detract from the effects of the present invention, and may be of any type as long as they are (meth)acrylate esters constituted from acrylic acid components and alcohol components, but (meth)acrylate esters having an alcohol component with 1 to 15 carbon atoms are preferable. Preferred examples of (meth)acrylate esters include, but are not limited to, primary alkyl (meth)acrylate esters such as methyl (meth)acrylate, ethyl (meth)acrylate, n-propyl (meth)acrylate, n-butyl (meth)acrylate, isobutyl (meth)acrylate, 2-ethylhexyl (meth)acrylate and lauryl (meth)acrylate, glydicyl (meth)acrylate, ally (meth)acrylate, 2-methoxyethyl (meth)acrylate, 3-methoxybutyl (meth) acrylate, trimethoxysilylpropyl (meth)acryalte, trifluoroethyl (meth)acrylate, isopropyl (meth)acrylate, t-butyl (meth)acrylate, sec-butyl (meth)acrylate, cyclohexyl (meth) acrylate, isobornyl (meth)acrylate and trimethylsilyl (meth) acrylate. Additionally, the (meth)acrylate esters [$a^1$] and [$a^2$] may be of one or more types. During the polymerization reaction of the present embodiment, the effects of blocking efficiency etc. are particularly pronounced in polymerization where the (meth)acrylate esters [$a^1$] and [$a^2$] are primary alkyl (meth)acrylate esters, so the (meth)acrylate esters [$a^1$] and [$a^2$] that are used should preferably be mainly primary alkyl (meth)acrylate esters. Furthermore, the polymer blocks should preferably have a glass transition temperature of at least 90° C., the polymer blocks should more preferably have a glass transition temperature of 90 to 150° C., and the polymer blocks should most preferably have a glass transition temperature of 100to 120° C.

The type of structure derived from the alkyl acrylate ester and/or alkyl methacrylate ester of [b] in Formula (1) is not particularly limited as long as it has a chemical structure differing from [$a^1$] and [$a^2$], within such a range as not to detract from the effects of the present invention. Typical examples include the (meth)acrylate esters mentioned above. Furthermore, the polymer blocks should preferably have a glass transition temperature of −10° C. or less, the polymer blocks should more preferably have a glass transition temperature of −30 to −70° C., and the polymer blocks should most preferably have a glass transition temperature of −45 to −50° C.

The ratio (total mass of [a'] and [$a^2$]/(mass of [b]) in the (4) acrylic block copolymer should be 5/95 to 80/20, preferably 5/95-70/30, more preferably 15/85 to 65/35, and most preferably 40/60 to 55/45, in order to achieve good solubility, adhesiveness and transparency.

The (4) acrylic block copolymer should preferably be a triblock copolymer of polymethylmethacrylate/poly-n-butylacrylate/polymethylmethacrylate, in order to achieve good solubility, adhesiveness and transparency.

The weight-average molecular weight of the (4) acrylic block copolymer should preferably be 5,000 to 4,000,000, preferably 10,000 to 100,000, more preferably 30,000 to 80,000 and most preferably 50,000 to 70,000 for greater effect.

The molecular weight distribution (weight-average molecular weight/number-average molecular weight) of the acrylic block copolymer should preferably be 0.5 to 1.5, more preferably 0.7 to 1.3, and most preferably 1.0 to 1.2 in order to achieve better solubility, adhesiveness and transparency.

The amount of the acrylic block copolymer used is preferably 2 to 80 parts by mass, more preferably 40 to 70 parts by mass with respect to 100 parts by mass of the polymerizable vinyl monomer. At 2 parts by mass or more, the adhesive force and transparency are high, and at 80 parts by mass or less, the viscosity is low so high usability can be maintained.

The curable resin composition of the present embodiment may use various types of paraffins in order to quickly cure the portions coming into contact with air. Examples of paraffins include, but are not limited to, paraffin wax, microcrystalline wax, carnauba wax, beeswax, lanolin, spermaceti, ceresin and candelilla wax.

The amount of paraffin used is preferably 0.01 to 2.5 parts by mass, more preferably 0.05 to 0.5 parts by mass with respect to 100 parts by mass of polymerizable vinyl monomer. At 0.01 parts by mass or more, the hardness of the portion coming into contact with air can be satisfactorily maintained, and at 2.5 parts by mass or less, a satisfactory adhesive strength can be achieved.

Additionally, the curable resin composition of the present embodiment may use (meth)acrylic acid in order to improve the adhesiveness. The amount of (meth)acrylic acid used is preferably 0.1 to 20 parts by mass, more preferably 1 to 10 parts by mass with respect to 100 parts by mass of the polymerizable vinyl monomer.

While the curable resin composition of the present embodiment can be used as an adhesive composition as is, in a more preferable embodiment, it can be used as a two-component type adhesive composition. In that case, the two-component format may include the (2) curing agent in the first component and the (3) reducing agent in the second component, and the other ingredients may be divided as appropriate between the two components. (Meth)acrylic acid should preferably be used in the second component. This two-component type curable resin composition may be used as an adhesive after bringing the components into contact immediately prior to use and curing.

The adhesive composition of the present invention may be used to bond parts together to form a bonded object. Additionally, the various materials of the adhered parts should exhibit particularly good adhesiveness and transparency with respect to transparent resins (for example, acrylic resins, polycarbonate resins, etc.).

The curable resin composition and the like explained for the above embodiment should not be construed as limiting the present invention, and are disclosed only for exemplary purposes. The technical scope of the present invention is defined by the claims, and those skilled in the art will recognize that various design modifications are possible within the technical scope of the inventions recited in the claims.

For example, the above-described curable resin composition and the like may contain additives that are normally used in the production of resin compositions, in amounts within a range that will not detract from the effects of the present invention. Examples of additives include fillers chosen from among inorganic materials such as calcium carbonate, aluminum hydroxide, silica, clay, talc and titanium oxide, inorganic hollow materials such as glass balloons, Shirasu balloons and ceramic balloons, organic materials such as nylon beads, acrylic beads and silicon beads, and organic hollow materials such as vinylidene chloride balloons and acrylic balloons, foaming agents, dyes, pigments, silane coupling agents, polymerization inhibiting agents and stabilizing agents.

Additionally, the use of the above-described curable resin composition as an adhesive (especially an adhesive for use with transparent resins) or a coating (especially a coating for use with transparent resins), and a method of bonding or a method of coating bonded objects (especially transparent resins) with the above-described curable resin composition (or result of curing thereof) are included among embodiments of the present invention. Furthermore, a method of producing a composite comprising the steps of applying the above-described curable resin composition to the surface of an object to be bonded (especially a transparent resin) so as to bond or coat the object to be bonded is also included among the embodiments of the present invention.

EXAMPLES

Herebelow, the present invention shall be explained in further detail by means of examples, but the present invention is not limited thereto.

The units for the amounts of the respective substances used are expressed in parts by mass. For the purposes of the present example, room temperature shall refer to 23° C. The various physical properties were measured as follows.
(Weight-Average Molecular Weight, Molecular Weight Distribution)

A sample was diluted with tetrahydrofuran to 0.1 wt/V %, filtered with a membrane filter, then measured by size exclusion chromatography (SEC).
Device: Tosoh GPC-8020 SEC System
The analysis conditions were as follows:
Column: TSK Guard HZ-L+HZM-N 6.0×150 mm×3
Flow rate: 0.5 ml/min
Detector: RI-8020
Concentration: 0.1 wt/vol %
Injection quantity: 20 μL
Column temperature: 40° C.
System temperature: 40° C.
Solvent: THF
(Tensile Shear Adhesive Strength (Shear Strength))

Performed in accordance with JISK-6850. An adhesive obtained by mixing two components was applied to one surface of a test sample (100×25×5 mm polycarbonate resin or 100×25×3 mm acrylic resin), which was immediately laid over and bonded to another test sample (100×25×5 mm polycarbonate resin or 100×25×3 mm acrylic resin), then let stand for 24 hours at room temperature to form a sample for testing tensile shear adhesion strength. In order to make the thickness of the adhesive composition layer uniform, minute amounts of glass beads of grain size 125 μm were added to the adhesive. The tensile shear adhesion strength (units: MPa) was measured at a pulling rate of 10 mm/minute at a temperature of 23° C. and humidity of 50%.
(Transparency Evaluation of Cured Object)

An adhesive obtained by mixing two components evenly was cured, then let stand for 24 hours at room temperature to obtain a 25×50×2 mm cured object. A haze meter (Suga Test Instruments, TM double-beam type haze computer) was used to take haze measurements. The haze value in this case was defined by the following formula:

Haze value=$Td/Tt$×100%

Td: diffuse transmittance Tt: total luminous transmittance
(Transparency Evaluation as Composite with Bonded Object)

An adhesive obtained by mixing two components was applied to one surface of a test sample (100×25×5 mm polycarbonate resin or 100×25×3 mm acrylic resin), which was immediately laid over and bonded to another test sample (100×25×5 mm polycarbonate resin or 100×25×3 mm acrylic resin), then let stand for 24 hours at room temperature to form a sample for testing tensile shear adhesion strength. In order to make the thickness of the adhesive composition layer uniform, minute amounts of glass beads of grain size 125 μm were added to the adhesive. A haze meter (Suga Test Instruments, TM double-beam type haze computer) was used to take haze measurements.
(Glass Transition Temperature)

A curable resin composition was sandwiched between PET films and cured using a 1 mm thick silicon sheet as the mold, and let stand for 24 hours at room temperature to obtain a cured object of thickness 1 mm. The resulting cured object was cut to a length of 50 mm and a width of 5 mm using a cutter to form cured objects for measurement of glass transition temperature. The resulting cured objects were measured in a nitrogen atmosphere under conditions of a temperature increase speed of 2° C. per minute, using a dynamic visoelasticity measuring device DMS210 by Seiko Electronics, and the peak temperatures of the resulting tan δ were recorded as the glass transition temperatures.

EXPERIMENTAL EXAMPLES

The respective substances in Tables 1 and 2 were mixed at the listed proportions, to prepare adhesive compositions consisting of a first component and a second component. These were tested for the tensile shear adhesion strength with bonded objects of various transparent resins, haze values of the cured objects and haze values of the composites with bonded objects. The results are shown together in Tables 1 and 2.

The following triblock copolymer was used as the acrylic block copolymer. The triblock copolymer was a triblock copolymer of polymethylmethacrylate/poly-n-butylacrylate/polymethylmethacrylate. Product Name "LA4285" (Kuraray), poly-n-butylacrylate content 50 mass %, weight-average molecular weight 65,000, molecular weight distribution 1.1. Product Name "LA2250" (Kuraray), poly-n-butylacrylate content 30 mass %, weight-average molecular weight 80,000, molecular weight distribution 1.1. Product Name "LA2140e" (Kuraray), poly-n-butylacrylate content 25 mass %, weight-average molecular weight 80,000, molecular weight distribution 1.1.

The acrylic block copolymer satisfies the following formula (2):

$$[a^1]\text{-}[b]\text{-}[a^2] \tag{2}$$

In the formula, $[a^1]$ is a polymer block consisting of polymethylmethacrylate, having a glass transition temperature of 100 to 120° C.

$[a^2]$ is a polymer block consisting of polymethylmethacrylate, having a glass transition temperature of 100 to 120° C.

[b] is a polymer block consisting of poly-n-butylacrylate, having a glass transition temperature of −50 to −45° C.

Sum of masses of $[a^1]$ and $[a^2]$/Mass of [b]=1/1.

As the acrylonitrile-butadiene rubber, the following was used.
Product Name "DN612P" (Zeon), random copolymer.

TABLE 1

|  |  | Comp Ex 1 | Comp Ex 2 | Ex 1 | Ex 2 | Ex 3 | Ex 4 |
| --- | --- | --- | --- | --- | --- | --- | --- |
| First Agent | Methylmethacrylate | 50 | 50 | 50 | 60 | 50 | 50 |
|  | Phenoxyethylmethacrylate | 40 | 40 | 40 | 30 | 40 | 40 |
|  | 2,2-bis(4-(meth)acryloxydiethoxyphenyl)propane | 10 | 10 | 10 | 10 | 10 | 10 |
|  | LA 4285 |  |  | 50 | 50 | 40 | 70 |
|  | Acrylonitrile butadiene rubber | 10 | 50 |  |  |  |  |
|  | Cumene hydroperoxide | 5.0 | 5.0 | 5.0 | 5.0 | 5.0 | 5.0 |
|  | Paraffin | 0.2 | 0.2 | 0.2 | 0.2 | 0.2 | 0.2 |

TABLE 1-continued

|  |  | Comp Ex 1 | Comp Ex 2 | Ex 1 | Ex 2 | Ex 3 | Ex 4 |
|---|---|---|---|---|---|---|---|
| Second Agent | Methylmethacrylate | 50 | 50 | 50 | 60 | 50 | 50 |
|  | Phenoxyethylmethacrylate | 40 | 40 | 40 | 30 | 40 | 40 |
|  | 2,2-bis(4-(meth)acryloxydiethoxyphenyl) propane | 10 | 10 | 10 | 10 | 10 | 10 |
|  | LA 4285 |  |  | 50 | 50 | 40 | 70 |
|  | Acrylonitrile butadiene rubber | 10 | 50 |  |  |  |  |
|  | Ethylthiourea | 1.5 |  |  |  |  |  |
|  | Acetyl-2-thiourea |  | 1.5 | 1.5 | 1.5 | 1.5 | 1.5 |
|  | Methacrylic acid | 4.0 | 4.0 | 4.0 | 4.0 | 4.0 | 4.0 |
|  | Paraffin (paraffin wax) | 0.2 | 0.2 | 0.2 | 0.2 | 0.2 | 0.2 |
| Evaluation | Polycarbonate resin shear strength [MPa] | 1.6 | 2.5 | 3.0 | 3.0 | 3.0 | 2.5 |
|  | Acrylic resin shear strength [MPa] | 6.0 | 4.2 | 4.2 | 3.6 | 6.0 | 4.2 |
|  | Polycarbonate resin composite haze | 50 | 60 | 15 | 5.0 | 17 | 10 |
|  | Acrylic resin composite haze | 30 | 40 | 7.0 | 5.0 | 9.0 | 6.0 |
|  | Cured object haze | 15 | 25 | 4.0 | 3.0 | 8.0 | 4.0 |

The components are in units of parts by mass.

TABLE 2

|  |  | Ex 5 | Ex 6 | Ex 7 | Ex 8 | Ex 9 | Ex 10 |
|---|---|---|---|---|---|---|---|
| First Agent | Methylmethacrylate | 50 | 50 | 50 | 50 | 90 | 80 |
|  | Phenoxyethylmethacrylate | 40 | 40 |  | 40 |  |  |
|  | 2,2-bis(4-(meth)acryloxydiethoxyphenyl) propane | 10 | 10 | 10 |  |  | 10 |
|  | 2-hexylethylmethacrylate |  |  | 40 |  |  |  |
|  | EO-modified bisphenol A dimethacrylate |  |  |  | 10 | 10 | 10 |
|  | LA 4285 |  |  | 50 | 50 | 50 | 50 |
|  | LA 2250 | 50 |  |  |  |  |  |
|  | LA 2140e |  | 50 |  |  |  |  |
|  | Cumene hydroperoxide | 5.0 | 5.0 | 5.0 | 5.0 | 5.0 | 5.0 |
|  | Paraffin | 0.2 | 0.2 | 0.2 | 0.2 | 0.2 | 0.2 |
| Second Agent | Methylmethacrylate | 50 | 50 | 50 | 50 | 90 | 80 |
|  | Phenoxyethylmethacrylate | 40 | 40 |  | 40 |  |  |
|  | 2,2-bis(4-(meth)acryloxydiethoxyphenyl) propane | 10 | 10 | 10 |  |  | 10 |
|  | 2-hexylethylmethacrylate |  |  | 40 |  |  |  |
|  | EO-modified bisphenol A dimethacrylate |  |  |  | 10 | 10 | 10 |
|  | LA 4285 |  |  | 50 | 50 | 50 | 50 |
|  | LA 2250 | 50 |  |  |  |  |  |
|  | LA 2140e |  | 50 |  |  |  |  |
|  | Acetyl-2-thiourea | 1.5 | 1.5 | 1.5 | 1.5 | 1.5 | 1.5 |
|  | Methacrylic acid | 4.0 | 4.0 | 4.0 | 4.0 | 4.0 | 4.0 |
|  | Paraffin (paraffin wax) | 0.2 | 0.2 | 0.2 | 0.2 | 0.2 | 0.2 |
| Evaluation | Polycarbonate resin shear strength [MPa] | 3.2 | 2.3 | 2.0 | 2.2 | 2.2 | 3.2 |
|  | Acrylic resin shear strength [MPa] | 3.6 | 3.1 | 3.1 | 3.1 | 2.7 | 3.4 |
|  | Polycarbonate resin composite haze | 18 | 17 | 15 | 5.0 | 5.0 | 5.0 |
|  | Acrylic resin composite haze | 15 | 14 | 8.0 | 5.0 | 5.0 | 5.0 |
|  | Cured object haze | 10 | 10 | 4.0 | 3.0 | 3.0 | 3.0 |

The components are in units of parts by mass.

In "EO-modified bisphenol A dimethacrylate", "EO" refers to ethylene oxide.

The EO-modified bisphenol A dimethacrylate was in accordance with general formula (C), wherein $Z_3$ and $Z_4$ denote $CH_2=C(CH_3)CO-$ groups, $R_4$ and $R_5$ denote $-C_2H_4-$, $R_6$ and $R_7$ denote methyl groups, and $q+r=2$.

The following can be confirmed from Table 1. The present invention, for example, has a high tensile shear adhesion strength of at least 2 MPa, as well as low haze values of no more than 18% for a polycarbonate resin composite, no more than 15% for an acrylic resin composite, and no more than 10% for a cured object, thus exhibiting good adhesiveness and transparency.

The present invention has been explained with reference to examples above. The examples are to be construed as no more than exemplary, and those skilled in the art will understand that various modifications are possible and that such modifications will also be within the scope of the present invention.

INDUSTRIAL APPLICABILITY

The present invention is capable of maintaining high adhesiveness and maintaining transparency in bonding together transparent resins, so it is applicable to bonding applications to transparent resins such as show windows.

The invention claimed is:
1. A curable resin composition, comprising:
a polymerizable vinyl monomer,
a curing agent comprising an organic peroxide,
a paraffin,
a (meth)acrylic acid,
a reducing agent, and an acrylic block copolymer having a structure of formula (II):

$$[a^1]\text{-}[b]\text{-}[a^2] \quad (II)$$

wherein
[$a^1$] is a polymer block consisting of polymethylmethacrylate, and having a glass transition temperature of from 100 to 120° C.;
[$a^2$] is a polymer block consisting of polymethylmethacrylate, and having a glass transition temperature of from 100 to 120° C.;
[b] is a polymer block consisting of poly-n-butylacrylate, and having a glass transition temperature of from −50 to −45° C.;
a ratio of a total mass of [$a^1$] and [$a^2$] to a mass of [b] is from 40/60 to 55/45;
the polymerizable vinyl monomer comprises from 30 to 80 parts by mass of (A) a methylmethacrylate monomer, from 10 to 50 parts by mass of (B) a phenoxyethylmethacrylate monomer and/or a 2-hexylethylmethacrylate monomer, and from 1 to 20 parts by mass of (C) a 2,2-bis(4-(meth)acryloxydiethoxyphenyl)propane monomer and/or an ethylene oxide-modified bisphenol A dimethacrylate monomer;
the curable resin composition, when cured, has a haze of from 3% to 10%, expressed as a ratio of diffuse transmittance over luminous transmittance;
wherein a total content of the polymerizable vinyl monomer, the curing agent, the paraffin, the (meth)acrylic acid, the reducing agent, and the acrylic block copolymer having a structure of formula (II) is at least 90 mass %; and
a content of the acrylic block copolymer is from 40 to 70 parts by mass per 100 parts by mass of the polymerizable vinyl monomer.

2. The composition of claim 1,
wherein a content of the organic peroxide is from 0.1 to 20 parts by mass per 100 parts by mass of the polymerizable vinyl monomer,
a content of the paraffin is from 0.01 to 2.5 parts by mass per 100 parts by mass of the polymerizable vinyl monomer,
a content of the reducing agent is from 0.05 to 15 parts by mass per 100 parts by mass of the polymerizable vinyl monomer, and
a content of the (meth)acrylic acid is from 0.1 to 20 parts by mass per 100 parts by mass of the polymerizable vinyl monomer.

3. A curable resin composition, consisting essentially of:
a polymerizable vinyl monomer,
from 0.1 to 20 parts by mass of an organic peroxide as a curing agent, per 100 parts by mass of the polymerizable vinyl monomer,
from 0.01 to 2.5 parts by mass of a paraffin, per 100 parts by mass of the polymerizable vinyl monomer,
from 0.1 to 20 parts by mass of a (meth)acrylic acid, per 100 parts by mass of the polymerizable vinyl monomer,
from 0.05 to 15 parts by mass of a reducing agent, per 100 parts by mass of the polymerizable vinyl monomer, and
from 40 to 70 parts by mass of an acrylic block copolymer, per 100 parts by mass of the polymerizable vinyl monomer,
wherein the acrylic block copolymer has a structure of formula (II):

$$[a^1]\text{-}[b]\text{-}[a^2] \quad (II)$$

wherein
[$a^1$] is a polymer block consisting of polymethylmethacrylate, and having a glass transition temperature of from 100 to 120° C.;
[$a^2$] is a polymer block consisting of polymethylmethacrylate, and having a glass transition temperature of from 100 to 120° C.;
[b] is a polymer block consisting of poly-n-butylacrylate, and having a glass transition temperature of from −50 to −45° C.;
a ratio of a total mass of [$a^1$] and [$a^2$] to a mass of [b] is 1/1;
the polymerizable vinyl monomer consists essentially of from 30 to 80 parts by mass of (A) a methylmethacrylate monomer, from 10 to 50 parts by mass of (B) a phenoxyethylmethacrylate monomer and/or a 2-hexylethylmethacrylate monomer, and from 1 to 20 parts by mass of (C) a 2,2-bis(4-(meth)acryloxydiethoxyphenyl)propane monomer and/or an ethylene oxide-modified bisphenol A dimethacrylate monomer; and
the curable resin composition, when cured, has a haze of from 3% to 10%, expressed as a ratio of diffuse transmittance over luminous transmittance.

4. The curable resin composition of claim 3, wherein a weight-average molecular weight of the acrylic block copolymer is from 5,000 to 4,000,000.

5. The curable resin composition of claim 3, wherein a molecular weight distribution of the acrylic block copolymer is from 0.5 to 1.5.

6. The curable resin composition of claim 3, wherein the reducing agent is at least one thiourea derivative selected from the group consisting of acetyl-2-thiourea, benzoylthiourea, N,N-diphenyithiourea, N,N-diethylthiourea, N,N-dibutylthiourea, and tetramethylthiourea.

7. The curable resin composition of claim 3, wherein a molecular weight distribution of the acrylic block copolymer is from 1.0 to 1.2.

8. The curable resin composition of claim 3, wherein the reducing agent is at least one thiourea derivative selected from the group consisting of acetyl-2-thiourea, benzoylthiourea, N,N-diphenylthiourea, and N,N-diethylthiourea.

9. The curable resin composition of claim 3, wherein the reducing agent is acetyl-2-thiourea.

10. The curable resin composition of claim 3, wherein the curing agent is at least one selected from the group consisting of cumene hydroperoxide, paramenthane hydroperoxide, tertiary butyl hydroperoxide, diisopropylbenzene dihydroperoxide, methylethylketone peroxide, benzoyl peroxide, and tertiary butyl peroxybenzoate.

11. The curable resin composition of claim 3, wherein the curing agent is cumene hydroperoxide.

12. The curable resin composition of claim 3, wherein the polymerizable vinyl monomer consists essentially of from 40 to 70 parts by mass of the monomer (A), from 20 to 40 parts by mass of the monomer (B), and from 5 to 15 parts by mass of the monomer (C).

13. The curable resin composition of claim 3,
wherein the composition is a two-component curable resin composition,
the curing agent is in a first component of the two-component curable resin composition, and
the reducing agent is in a second component of the two-component curable resin composition.

14. An adhesive composition comprising the curable resin composition of claim 3.

15. A cured object comprising the adhesive composition of claim 14.

16. A composite, comprising an adhered object coated or bonded by the cured object of claim 15.

17. The composite of claim 16, wherein the adhered object is a transparent resin, and wherein a haze of the adhesive composition in cured form is from 3% to 10%, expressed as a ratio of diffuse transmittance over luminous transmittance.

\* \* \* \* \*